US006380273B1

(12) United States Patent
Eilbracht et al.

(10) Patent No.: US 6,380,273 B1
(45) Date of Patent: Apr. 30, 2002

(54) PROCESS FOR PRODUCING FLAME-RETARDANT FLEXIBLE POLYURETHANE FOAMS

(75) Inventors: Christian Eilbracht, Herne; Martin Sicken, Köln, both of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/594,949

(22) Filed: Jun. 9, 2000

(30) Foreign Application Priority Data

Jun. 16, 1999 (DE) .......................................... 199 27 548

(51) Int. Cl.$^7$ .................................................. C08J 9/00
(52) U.S. Cl. ........................ 521/108; 521/106; 521/107; 521/165
(58) Field of Search ................................. 521/106, 107, 521/108, 165

(56) References Cited

U.S. PATENT DOCUMENTS

| 2,764,565 A | | 9/1956 | Hope et al. |
| 3,580,868 A | | 5/1971 | Diehr et al. |
| 3,580,890 A | | 5/1971 | Diehr et al. |
| 3,741,917 A | | 6/1973 | Morehouse |
| 3,887,483 A | | 6/1975 | Morehouse |
| 3,956,200 A | * | 5/1976 | Biranowski ........... 260/2.5 AR |
| 4,018,723 A | * | 4/1977 | Kanner et al. ......... 260/2.5 AH |
| 4,045,378 A | | 8/1977 | Maxwell |
| 4,248,930 A | | 2/1981 | Haas et al. |
| 4,263,408 A | | 4/1981 | Meyborg et al. |
| 5,456,984 A | * | 10/1995 | Bishop et al. ............... 428/373 |
| 5,608,100 A | | 3/1997 | Sicken |

FOREIGN PATENT DOCUMENTS

| DE | 1694142 | 10/1970 |
| DE | 1694215 | 4/1971 |
| DE | 1720768 | 7/1971 |
| DE | 2153086 | 4/1972 |
| DE | 2732292 | 2/1979 |
| DE | 2832253 | 1/1981 |
| DE | 4342972 | 6/1995 |
| GB | 1 094 489 | 12/1967 |
| GB | 1162517 | 8/1969 |
| GB | 1211405 | 11/1970 |
| JP | 06 306 277 | 11/1994 |

OTHER PUBLICATIONS

English Abstract of DE 4342972, Jun. 22, 1995.
Siefken, Justus Liebigs Annalen Der Chemie, pp 76–136; Dec. 11, 1948.
Oertel, Kunstoff–Handbach [Plastics Handbook] "Polyurethane", vol. 7, pp 103–127 1993.
Houben–Weyl, vol. XII/1, pp. 23–431 and 495–501 (most relevant pages).
EPO Search Report.
Patent Abstract for Japan Patent No. 52 027721.
Chemical Abstract, vol. 72, No. 13, Mar. 30, 1970, XP–002148337.
Chemical Abstract, vol. 105, No. 12, Sep. 22, 1986, XP–002148338.

* cited by examiner

*Primary Examiner*—James J. Seidleck
*Assistant Examiner*—Melanie Bagwell-Bissett
(74) *Attorney, Agent, or Firm*—Anthony A. Bisulca

(57) ABSTRACT

The invention relates to a process for the production of flame-resistant flexible polyurethane foams having a low susceptibility to core discoloration, which comprises using hydroxyalkyl phosphonates as halogen-free flame retardants and as core discoloration inhibitors. The invention furthermore relates to the use of hydroxyalkyl phosphonates as halogen-free flame retardants for the production of flame-resistant flexible polyurethane foams having a low susceptibility to core discoloration. Finally the invention also relates to a flame resistant flexible polyurethane foam having a low susceptibility to core discoloration which comprises hydroxyalkyl phosphonates as halogen-free flame retardants and as core discoloration inhibitor.

11 Claims, No Drawings

PROCESS FOR PRODUCING FLAME-RETARDANT FLEXIBLE POLYURETHANE FOAMS

BACKGROUND OF THE INVENTION

The invention relates to a process for the production of flame-resistant flexible polyurethane foams having a low susceptibility to core discoloration, and to the use of halogen-free hydroxyalkyl phosphonates for the production of flame-resistant flexible polyurethane foams having a low susceptibility to core discoloration. Finally, the invention also relates to a flame-resistant flexible polyurethane foam having a low susceptibility to core discoloration.

Polyurethane foams are employed as plastics in many areas, such as furniture, mattresses, transport, construction and industrial insulation. In order to achieve high flame resistance requirements, as required for materials, inter alia, for the automobile, rail and aircraft interior fittings sector and building insulation, polyurethane foams must generally be provided with flame retardants. A multiplicity of different flame retardants are known and commercially available for this purpose. However, considerable technical problems and/or toxicological reservations frequently stand in the way of their use.

Thus, metering problems occur on use of solid flame retardants, such as, for example, melamine, ammonium polyphosphate and ammonium sulfate, frequently requiring modifications of the foaming plants, i.e. complex modification and adaptation. A majority of the liquid flame retardants employed, such as, for example, tris(2-chloroethyl) phosphate, tris(2-chloroisopropyl) phosphate and tetrakis(2-chloroethyl) ethylene-diphosphate, are characterized by a clear migration tendency, which substantially restricts the potential use in open-cell flexible polyurethane foams stems for automobile internal fittings, owing to the requirements of condensable emissions (fogging). Fogging is taken to mean the condensation of evaporated volatile constituents from the motor vehicle interior fittings on glass surfaces, in particular on the windscreen. This phenomenon can be assessed quantitatively in accordance with DIN 75201.

Furthermore, halogen-free flame retardant systems are preferred from ecotoxicological points of view and owing to improved secondary phenomena associated with fire with respect to smoke density and smoke toxicity. For technical reasons too, halogen-free flame retardants may be of particular interest. Thus, strong corrosion phenomena are observed on the plant parts used for flame lamination of polyurethane foams in the case, for example, of the use of halogenated flame retardants. This is attributable to the hydrohalic acid emissions which occur during flame lamination of halogen-containing polyurethane foams.

Flame lamination is the term used for a process for bonding textiles and foams in which one side of a foam sheet is partially melted with the aid of a flame and immediately thereafter pressed with a textile web.

Against the background of the trend toward taking into account gaseous emissions (volatile organic compounds=VOCs), there are in addition increasing demands on the migration stability of flame retardants, which make even use of additive high-molecular-weight flame retardants questionable, so that alternative solutions must be sought.

The liquid halogen-free flame retardant systems known hitherto, such as, for example, dimethyl methanephosphonate or various alkyl and aryl phosphates, only satisfy the abovemetioned demands of the migration stability to an inadequate extent.

Solutions in the sense of high migration stability are offered here by aromatic bisphosphates, as described in JP 06306277, and hydroxyl-carrying oligomeric phosphoric acid esters (DE-A 43 42 972). These exhibit only very low fogging values, but have a significant core discoloration problem in the production of polyurethane foams which can be only partly reduced with the aid of core discoloration inhibitors, for example those based on hydroquinone (U.S. Pat. No. 4,045,378).

Core discoloration is taken to mean the brown coloration of polyurethane foams which occurs during industrial trial production owing to thermal oxidation. In the case of ether slabstock foams, this brown coloration occurs in the slab interior, inter alia if oxidation reactions occur with residual isocyanate groups or ether groups due to gas exchange of carbon dioxide by the advancing air. The resulting core discoloration (also known as scorching) may increase on use of certain additives. The temperature in the slab interior can increase so much that self-ignition can occur in the case of flexible ether foams.

In the case of a low degree of core discoloration, only a slight yellow coloration of the foam occurs, without significant effects on the mechanical properties. With increasing yellow-brown coloration, by contrast, the commencement of decomposition of the polyurethane foam is observed, with impairment of the mechanical properties.

The previous processes for the production of polyurethane foams have the disadvantage that, on use of liquid halogen-free flame retardants, the above-described core discoloration frequently occurs during the production process, which means that the production of polyurethane foams of low density is excluded owing to the increased risk of fire, white foam grades cannot be produced, and large amounts of flame retardant cannot be processed.

SUMMARY OF THE INVENTION

The object of the present invention is to provide a process for the production of polyurethane foams containing halogen-free flame retardants and having high oxidative thermal resistance during foaming. The process should be usable for flexible ester and ether foams and for rigid foams and should facilitate the production of polyurethane foams having low fogging values. At the same time, the process should give polyurethane foams having high aging resistance of the flame resistance, i.e. the polyurethane foam still has effective flame resistance after a corresponding storage duration, even at elevated temperature.

The present object is achieved by a process for the production of flame-resistant flexible polyurethane foams having a low susceptibility to core discoloration, which comprises employing hydroxyalkyl phosphonates as halogen-free flame retardants and as core discoloration inhibitors.

DESCRIPTION OF THE PREFERRED EMBODIMENT

The hydroxyalkyl phosphonates preferably conform to the general formula I

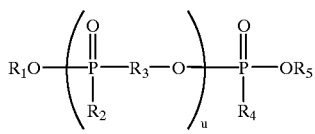

(I)

in which
u denotes a chain length of from 0 to 10
$R_1$ and $R_5$ are identical or different and are a hydroxyl-containing radical of the general formula II

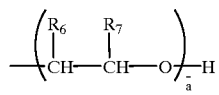

(II)

$R_2$ and $R_4$ are identical or different and are an alkyl, aryl or alkylaryl group having 1 to 12 carbon atoms
$R_3$ is a radical of the general formula III

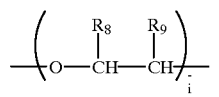

(III)

$\bar{a}$ denotes an average chain length of from 0 to 4
$\bar{i}$ denotes an average chain length of from 0 to 4
$R_6$, $R_7$, $R_8$ and $R_9$ are identical or different and are, independently of one another, H or an alkyl group having 1 to 6 carbon atoms.

Particularly preferably,
u denotes a chain length of 0 or 1
$\bar{a}$ denotes an average chain length of from 1 to 2
$\bar{i}$ denotes an average chain length of from 1 to 2
$R_2$ and $R_4$ are identical or different and are, independently one another, an alkyl group having 1 to 5 carbon atoms
$R_6$, $R_7$, $R_8$ and $R_9$ are identical or different and are, independently of one another, H or an alkyl group having 1 or 2 carbon atoms.

In the formulae of the abovemetioned hydroxyalkyl phosphonates employed in accordance with the invention, numbers such as u (for the formula I) indicate how often a certain group is present in the molecule. Mixtures of different hydroxyalkyl phosphonates are also possible, i.e. the values for u may be different and ultimately a mean value $\bar{u}$ is obtained.

The hydroxyalkyl phosphonates are preferably hydroxyethyl methanephosphonate, hydroxyethyl ethanephosphonate, hydroxypropyl methanephosphonate, hydroxypropyl ethanephosphonate, hydroxyethyl propanephosphonate, hydroxypropyl propanephosphonate, diethylene glycol bis(hydroxyalkoxy) methanephosphonate and/or ethylene glycol bis(hydroxyalkoxy) ethanephosphonate.

The process according to the invention is preferably carried out by reacting organic polyisocyanates with compounds containing at least 2 isocyanate-reactive hydrogen atoms with conventional blowing agents, stabilizers, activators and/or further conventional auxiliaries and additives in the presence of halogenfree hydroxyalkyl phosphonates of the general formula I.

The hydroxyalkyl phosphonates of the general formula I are preferably compounds which are liquid at the processing temperature. The processing temperature here is taken to mean the temperature at which the polyurethane raw materials are fed to the metering and mixing units of the foaming plants. In general, temperatures of from 20 to 80° C. are selected here, depending on the viscosities of the components and the design of the metering units.

The hydroxyalkyl phosphonates of the general formula I are preferably isocyanate-reactive compounds.

The hydroxyalkyl phosphonates of the general formula I preferably exhibit high migration stability.

The hydroxyalkyl phosphonates of the general formula I are preferably employed in an amount of from 0.01 to 50 parts, based on the resultant flexible polyurethane foam.

The hydroxyalkyl phosphonates of the general formula I are particularly preferably employed in an amount of from 0.15 to 10 parts, based on the resultant flexible polyurethane foam.

However, it is basically also possible for the abovementioned hydroxyalkyl phosphonates to completely replace the polyols which are usual for the preparation.

Further core discoloration inhibitors and/or flame retardants known per se are preferably employed.

The abovemetioned object is likewise achieved by the use of halogen-free hydroxyalkyl phosphonates for the production of flame-resistant flexible polyurethane foams having a low susceptibility to core discoloration.

The hydroxyalkyl phosphonates preferably conform to the general formula I

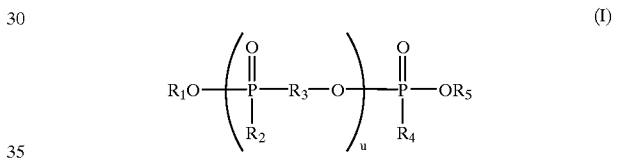

(I)

in which
u denotes a chain length of from 0 to 10
$R_1$ and $R_5$ are identical or different and are a hydroxyl-containing radical of the general formula II

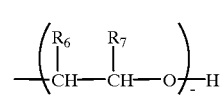

(II)

$R_2$ and $R_4$ are identical or different and are an alkyl, aryl or alkylaryl group having 1 to 12 carbon atoms
$R_3$ is a radical of the general formula III

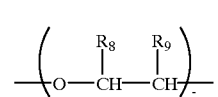

(III)

$\bar{a}$ denotes an average chain length of from 0 to 4
$\bar{i}$ denotes an average chain length of from 0 to 4
$R_6$, $R_7$, $R_8$ and $R_9$ are identical or different and are, independently of one another, H or an alkyl group having 1 to 6 carbon atoms.

Particularly preferably,
u denotes a chain length of 0 or 1
$\bar{a}$ denotes an average chain length of from 1 to 2
$\bar{i}$ denotes an average chain length of from 1 to 2

$R_2$ and $R_4$ are identical or different and are, independently of one another, an alkyl group having 1 to 5 carbon atoms $R_6$, $R_7$, $R_8$ and $R_9$ are identical or different and are, independently of one another, H or an alkyl group having 1 or 2 carbon atoms.

The hydroxyalkyl phosphonates are preferably hydroxyethyl methanephosphonate, hydroxyethyl ethanephosphonate, hydroxypropyl methanephosphonate, hydroxypropyl ethanephosphonate, hydroxyethyl propanephosphonate, hydroxypropyl propanephosphonate, diethylene glycol bis(hydroxyalkoxy) methanephosphonate and/or ethylene glycol bis(hydroxyalkoxy) ethanephosphonate.

Finally, the invention also relates to a flame-resistant flexible polyurethane foam having a low susceptibility to core discoloration which comprises, as core discoloration inhibitor and as flame retardant, hydroxyalkyl phosphonates of the general formula I

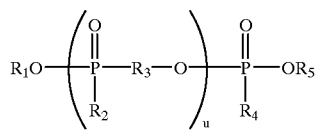

(I)

in which u denotes a chain length of from 0 to 10

$R_1$ and $R_5$ are identical or different and are a hydroxyl-containing radical of the general formula II

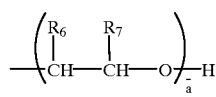

(II)

$R_2$ and $R_4$ are identical or different and are an alkyl, aryl or alkylaryl group having 1 to 12 carbon atoms $R_3$ is a radical of the general formula II

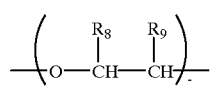

(III)

$\bar{a}$ denotes an average chain length of from 0 to 4

$\bar{i}$ denotes an average chain length of from 0 to 4

$R_6$, $R_7$, $R_8$ and $R_9$ are identical or different and are, independently of one another, H or an alkyl group having 1 to 6 carbon atoms.

The production of isocyanate-based foams is known per se and is described, for example, in DEA 16 94 142, DE-A 16 94 215 and DE-A 17 20 768 and in Kunststoff-Handbuch Volume VII, Polyurethanes, edited by Vieweg and Höchtlen, Carl Hanser Verlag, Munich, 1966, and in the new edition of this book, edited by G. Oertel, Carl Hanser Verlagn Munich, Vienna, 1983 and 1993.

The foams are predominantly foams containing urethane and/or isocyanurate and/or allophanate and/or uretdione and/or urea and/or carbodiimide groups. The use according to the invention preferably takes place in the production of polyurethane and polyisocyanurate foams.

For the production of the isocyanate-based foams, the following are employed:

As starting components: aliphatic, cycloaliphatic, araliphatic, aromatic and heterocyclic polyisocyanates (for example W. Siefken in Justus Liebigs Annalen der Chemie, 562, pp. 75–136), for example those of the formula Q(NCO)$_n$, where n=from 2 to 4, preferably from 2 to 3, and Q is an aliphatic hydrocarbon radical having 2 to 18, preferably 6 to 10, carbon atoms, a cycloaliphatic hydrocarbon radical having 4 to 15, preferably 5 to 10, carbon atoms, an aromatic hydrocarbon radical having 6 to 15, preferably 6 to 13, carbon atoms or an araliphatic hydrocarbon radical having 8 to 15, preferably 8 to 13, carbon atoms, for example polyisocyanates as described in DE-A 28 32 253, pages 10 to 11. In general, particular preference is given to the industrially readily accessible polyisocyanates derived from 2,4- and/or 2,6-tolylene diisocyanate or from 4,4'- and/or 2,4'-diphenylmethane diisocyanate.

The starting components are furthermore compounds containing at least two isocyanate-reactive hydrogen atoms and having a molecular weight of from 400 to 10,000 "polyol component"). Besides compounds containing amino groups, thio groups or carboxyl groups, these are preferably taken to mean compounds containing hydroxyl groups, in particular compounds containing from 2 to8 hydroxyl groups, especially those having a molecular weight of from 1000 to 6000, preferably from 200 to 6000, polyethers and polyesters generally containing from 2 to 8, but preferably from 2 to 6, hydroxyl groups, and polycarbonates and polyesteramides, as are known per se for the production of homogeneous and cellular polyurethacnes and as are described, for example, in DE-A 28 32 253. The polyethers and polyesters containing at least two hydroxyl groups are preferred in accordance with the invention.

Optional further starting components are compounds containing at least two isocyanate-reactive hydrogen atoms and having a molecular weight of from 32 to 399. In this case too, these are taken to mean compounds containing hydroxyl groups and/or amino groups and/or thio groups and/or carboxyl groups, preferably compounds containing hydroxyl groups and/or amino groups, which serve as chain extenders or crosslinking agents. These compounds generally have from 2 to 8, preferably from 2 to 4, isocyanate-reactive hydrogen atoms. Examples thereof are likewise described in DE-A 28 32 253.

Water and/or readily volatile organic substances as blowing agents, for example n-pentane, i-pentane, cyclopentane, halogen-containing alkanes, such as trichloromethane, methylene chloride, or chlorofluoroalkanes, $CO_2$ and others.

Auxiliaries and additives are optionally used at the same time, such as catalysts of the type known per se, surface-active additives, such as emulsifiers and foam stabilizers, reaction retardants, for example acidic substances, such as hydrochloric acid or organic acid halides, furthermore cell regulators of the type known per se, such as paraffins or fatty alcohols and dimethylpolysiloxanes, and pigments or dyes and further flame retardants of the type known per se, furthermore aging and weathering stabilizers, plasticizers and fungistatic and bacteriostatic substances, and fillers, such as barium sulfate, kieselguhr, carbon black or precipitated chalk (DE-A 27 32 292).

A further review of the raw materials, auxiliaries and additives used for the production of polyurethane foams and the process engineering for the production thereof is given in Kunststoff-Handbuch [Plastics Handbook] 7 "Polyurethanes" by Dr. Günther Oertel, 3$^{rd}$ revised Edn. 1993.

Further examples of surface-active additives and foam stabilizers, cell regulators, reaction retardants, stabilizer, flame-inhibiting substances, plasticizers, dyes and fillers, and fungistatic and bacteriostatic substances which may, if desired, be used at the same time in accordance with the invention and details on the mode of use and action of these additives are described in Kunststoff-Handbuch [Plastics Handbook], Volume VII, Carl Hanser Verlag, Munich, 1993, on pages 104 to 123.

Performance of the Process for the Production of Polyurethane Foams:

The reaction components are reacted by the one-step process known per se, the prepolymer process or the semi-prepolymer process, machinery frequently being used, for example as described in U.S. Pat. No. 2,764,565. Details on processing equipment which is also suitable in accordance with the invention are described in Kunststoff-Handbuch [Plastics Handbook], Volume VI, Carl Hanser Verlag, Munich, 1993, on pages 139 to 192.

Cold-curing foams can also be produced in accordance with the invention (GB Patent 1,162,517, DE-A 21 53 086).

However, it is of course also possible to produce foams by slabstock foaming or by the double conveyor belt process, which is known per se.

Polyisocyanurate foams are produced by the processes and under the conditions known for this purpose.

Thus, the polyurethane plastics which have been rendered flame-resistant in accordance with the invention can be produced as elastomers by casting, as rigid or flexible foams by a continuous or batch process or as foamed or solid molded articles.

Preference is given to flexible foams produced by a slabstock foaming process.

The products obtainable in accordance with the invention have the following uses, for example: furniture cushioning, textile inlays, mattresses, automobile seats, armrests, construction elements, and seat and dashboard coverings.

For the examples below, four different representatives of the abovementioned hydroxyalkyl phosphonates were prepared by the known methods of organic synthesis (Houben-Weyl, Volume XII/1, Part 1, pp. 423–524) and subjected to the corresponding tests. These hydroxyalkyl phosphonates are referred to below as F1 to F4.

F1: Hydroxyethyl Methanephosphonate

| Phosphorus content: | 12.5% (m/m) |
|---|---|
| Acid number: | <1 mg of KOH/g |
| Hydroxyl number: | 440 mg of KOH/g |

F2: Hydroxypropyl Methanephosphonate.

| Phosphorus content: | 11.5% (m/m) |
|---|---|
| Acid number: | <1 mg of KOH/g |
| Hydroxyl number: | 400 mg of KOH/g |

F3: Diethylene Glycol bis(hydroxyalkoxy methanephosphonate)

| Phosphorus content: | 12.7% (m/m) |
|---|---|
| Acid number: | <1 mg of KOH/g |
| Hydroxyl number: | 350 mg of KOH/g |

F4: Ethylene Glycol bis(hydroxyalkoxy ethanephosphonate)

| Phosphorus content: | 17.5% (m/m) |
|---|---|
| Acid number: | <1 mg of KOH/g |
| Hydroxyl number: | 380 mg of KOH/g |

Furthermore, for comparative testing, the commercially available, liquid and halogen-free phosphorus-containing flame retardants referred to as VF1 to VF5 were used:

VF1: Dimethyl methanephosphonate (®Reoflam DMMP, manufacturer: FMC GmbH),

VF2: Diethyl ethanephosphonate (®Levagard VP AC 4048 DEEP, manufacturer: Bayer AG), VF3: Diethyl N,N-bis(2-hydroxyethyl) aminomethanephosphonate (Levagard 4090 N, manufacturer: Bayer AG), VF4: Resorcinol bis(diphenyl phosphate) (®Fyrolflex RDP, manufacturer: Akzo Nobel)

VF5: Phosphoric acid polyester carrying hydroxyalkyl ester groups (®Eexolit OP 550, manufacturer: Clariant GmbH)

EXAMPLES

The invention is explained by the examples below:

The above-described flame retardants F1 to F4 were incorporated into flexible polyurethane foams having an NCO index of 105 of the following formulation. The NCO index is a parameter which describes the percentage ratio of the amount of isocyanate employed to the stoichiometric, i.e. calculated amount of isocyanate in the reaction of in each case one isocyanate-active group with an isocyanate group.

The following constituents were employed for the experiment:

| Polyether-polyol | ® Caradol SC 46-02, Shell Chemie, trifunctional polyether-polyol having a hydroxyl number of 48 mg of KOH/g |
|---|---|
| Catalysts | ® Niax A-1, OSi Specialities Inc., mixture of 70% of bis(2-dimethylaminomethyl) ether and 30% of dipropylene glycol |
| | ® Dabco 33-LV, Air Products, a mixture of 67% of dipropylene glycol and 33% of diazabicyclo[2.2.2] octane |
| Tin(II) ethylhexanoate | ® Desmorapid SO, Rhein Chemie Rheinau GmbH |
| Stabilizer | ® Tegastab B3460, Th. Goldschmidt AG, polyether-modified polysiloxane |
| Tolylene diisocyanate | ® Desmodur T80, Bayer AG, a mixture of 80% of 2,4-tolylene diisocyanate and 20% of 2,6-tolylene diisocyanate |

TABLE 1

Flexible polyurethane foam formulation based on flame retardants F1 to F4

| | Example | | | |
|---|---|---|---|---|
| | 1 | 2 | 3 | 4 |
| Polyether-polyol (® Caradol SC 46-02) | 100 parts | 100 parts | 100 parts | 100 parts |
| Flame retardant F1 | 4 parts | | | |
| Flame retardant F2 | | 4 parts | | |
| Flame retardant F2 | | | 4 parts | |
| Flame retardant F4 | | | | 4 parts |
| Water | 4 parts | 4 parts | 4 parts | 4 parts |
| Bis(2-dimethylaminoethyl) ether/glycol mixture (® Niax A1) | 0.1 part | 0.1 part | 0.1 part | 0.1 part |
| Diazabicyclo[2.2.2]octane/ dipropylene glycol (® Dabco 33-LV) | 0.2 part | 0.2 part | 0.2 part | 0.2 part |
| Silicone stabilizer (® Tegostab B 3460) | 1.0 part | 1.0 part | 1.0 part | 1.0 part |
| Tin(II) ethylhexanoate (® Desmorapid SO) | 0.13–0.20 part | 0.13–0.20 part | 0.13–0.20 part | 0.13–0.18 part |
| Tolylene diisocyanate (® Desmodur T80) | Index 105 | Index 105 | Index 105 | Index 105 |

For the production of the flexible polyurethane foams of Examples 1 to 4, all components—with the exception of the tolylene duisocyanate—were mixed intensively, and the tolylene diisocyanate was incorporated last.

Examples 5 to 9 (Comparative Examples)

The liquid phosphorus-containing flame retardants dimethyl methanephosphonate (VF1), diethyl ethanephosphonate (VF2), diethyl N,N-bis(2-hydroxyethyl) aminomethanephosphonate (VF3), resorcinol bis(diphenyl phosphate) (VF4) and a phosphoric acid polyester carrying hydroxyalkyl ester groups (VF5) were foamed analogously to the formulation and preparation procedure from Example 1.

TABLE 2

Flexible polyurethane foam formulation based on the flame retardants VF1 to VF5

| | Example | | | | |
|---|---|---|---|---|---|
| | 5 | 6 | 7 | 8 | 9 |
| Polyether-polyol (® Caradol SC 46-02, Shell) | 100 parts | 100 parts | 100 parts | 100 parts | 100 parts |
| Flame retardant VF1 | 4 parts | | | | |
| Flame retardant VF2 | | 4 parts | | | |
| Flame retardant VF3 | | | 4 parts | | |
| Flame retardant VF4 | | | | 4 parts | |
| Flame retardant VF5 | | | | | 4 parts |
| Water | 4 parts | 4 parts | 4 parts | 4 parts | 4 parts |
| Bis(2-dimethylaminoethyl) ether/glycol mixture (® Niax A1) | 0.1 part | 0.1 part | 0.1 part | 0.1 part | 0.1 part |
| Diazabicyclo[2.2.2]octane/ dipropylene glycol (® Dabco 33-LV) | 0.2 part | 0.2 part | 0.2 part | 0.2 part | 0.2 part |
| Silicone stabilizer (® Tegostab B 3460) | 1.0 part | 1.0 part | 1.0 part | 1.0 part | 1.0 part |
| Tin(II) ethylhexanoate (® Desmorapid SO) | 0.13–0.20 part | 0.13–0.20 part | 0.13–0.20 part | 0.13–0.20 part | 0.13–0.20 part |
| Tolylene diisocyanate (® Desmodur T80) | Index 105 | Index 105 | Index 105 | Index 105 | Index 105 |

Flame Resistance Testing:

In order to determine the flame resistance of the flexible polyurethane foams from Example 1 and Example 2, the FMVSS (Federal Motor Vehicle Safety Standard) test 302 was carried out before and after heat aging (7 days at 140° C. in accordance with DIN 53357). The results are shown in Table 3.

TABLE 3

Fire behavior in accordance with FMVSS 302

| Example | Flame retardant | Parts per 100 parts of polyether-polyol | FMVSS 302 classification | FMVSS 302 classification after aging |
|---|---|---|---|---|
| 1 | F1 | 4 | SE | SE |
| 2 | F2 | 4 | SE | SE/NBR |
| 3 | F3 | 4 | SE | SE |
| 4 | F4 | 4 | SE | SE |
| 5 | VF1 | 4 | SE/B | B |
| 6 | VF2 | 4 | SE/NBR | B |
| 7 | VF3 | 4 | SE/B | SE |
| 8 | VF4 | 4 | B | B |
| 9 | VF5 | 4 | SE | SE |

Terminology for Assessment of the Fire Behavior:
SE self-extinguishing
SE/NBR self-extinguishing/no burning rate
SE/B self-extinguishing (with burning rate)
B burning rate The high effectiveness of the flame retardants used in accordance with the invention (F1 to F4) is clearly evident. These flame retardants, like the hydroxylcontaining phosphoric acid ester VF5, enable classification in class SE even at only 4 parts per 100 parts of polyether-polyol. The high effectiveness of the hydroxyalkyl phosphonates is surprising since the commercially available halogen-free phosphonate-based flame retardants listed (VF1, VF2, VF3) have significantly lower effectiveness. Even the halogen-free liquid phosphoric acid ester-based flame retardant (VF4) results, when used in the same amount, only in classification in a lower fire protection class.

The high migration stability of the hydroxyalkyl phosphonates used (F1 to F4) is likewise evident from Table 3. The foam samples exhibit virtually unchanged fire behavior after heat aging. By contrast, the fire behavior of the flexible polyurethane foams provided with low-molecular-weight additive flame retardants (VF1, VF2) is clearly impaired.

Fogging Behavior Testing

The investigation of the fogging behavior of the claimed flame retardants was carried out on open-cell flexible polyether foams produced analogously to: the formulations applying to Examples 1 to 9 with an increased amount of flame retardant (in each case 8 parts). The determination of the fogging values was carried out in accordance with DIN 75201 by method G. In this, a test instrument manufactured by Haake, Karlsruhe, was employed in which the constituents which were condensable at 20° C. of the substances which were volatile at 100° C. in the test specimen were determined gravimetrically. The results are shown in Table 4.

TABLE 4

Fogging behavior in accordance with DIN 75201 method G

| Example | Flame retardant | Parts per 100 parts of polyether-polyol | Fogging value DIN 75201 |
|---|---|---|---|
| 1A | F1 | 8 | 0.5 mg |
| 2A | F2 | 8 | 0.5 mg |
| 3A | F3 | 8 | 0.4 mg |
| 4A | F4 | 8 | 0.6 mg |
| 5A | VF1 | 8 | 1.5 mg |
| 6A | VF2 | 8 | 3.8 mg |
| 7A | VF3 | 8 | 0.5 mg |
| 8A | VF4 | 8 | 1.0 mg |
| 9A | VF5 | 8 | 0.5 mg |

As can be seen from Table 4, the hydroxyl-carrying phosphonic acid esters used (F1 to F4) and the likewise isocyanate-reactive flame retardants ®Exolit OP 550 (VF5) and ®Levagard 4090 (VF3) are distinguished by extremely low fogging-values.

Thermooxidative Resistance Testing (core discoloration)

The thermooxidative resistance of the claimed hydroxylcarrying phosphonic acid esters was tested in accordance with a-method described in U.S. Pat. No. 4,131,660. Firstly, the flame retardants to be investigated were foamed in accordance with the flexible polyether foam formulation in Examples 1 to 9 and subsequently exposed to microwave radiation with a power of 400 W for 4 minutes. In order to evaluate the core discoloration, 2 cm thick slices were cut out of the foam slabs, and the observed yellow coloration of the foam samples was assessed visually. Depending on the color depth and extent of the discolored region, t he samples were assigned a core discoloration index of between 0 (no evident yellow coloration) and 6 (brown coloration over a large area).

| Example | Flame retardant | Parts | CD index |
|---|---|---|---|
| 1B | F1 | 8 | 1 |
| 2B | F2 | 8 | 1 |
| 3B | F3 | 8 | 1 |
| 4B | F4 | 8 | 1 |
| 5B | VF1 | 8 | 0 |
| 6B | VF2 | 8 | 0 |
| 7B | VF3 | 8 | 3 |
| 8B | VF4 | 8 | 1 |
| 9B | VF5 | 8 | 6 |

The polyurethane foams provided with the flameretardant additives according to the invention (1B to 4B) are surprisingly characterized by a high thermooxidative stability (CD index 1) which is in the region of the alkylphosphonic acidesters (VF1, VF2). This low core discoloration susceptibility is amazing in as much as comparable reactive flame retardants, such as the hydroxyalkyl-carrying phosphoric (VF5) and phosphonic acid esters (VF3) induce drastic core discoloration problems and thus have a lower thermooxidative stability than the claimed hydroxyalkyl phosphonates.

The hydroxyalkyl phosphonates employed in accordance with the invention are highly suitable halogen-free liquid flame retardants for polyurethane foams which are at the same time distinguished by surprisingly high effectiveness in flexible polyurethane foams, a core discoloration susceptibility which is amazingly low for reactive phosphorus-containing flame retardants, and high migration stability.

What is claimed is:
1. A process for the production of flame-resistant flexible polyurethane foams having a low susceptibility to core discoloration, which comprises using hydroxyalkyl phos- phonates as halogen-free flame retardants and as core discoloration inhibitors, wherein the hydroxyalkyl phosphonates conform to the general formula I

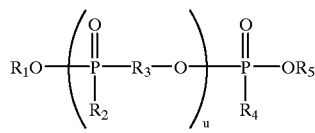

in which
u denotes a chaint length of from 0 to 10
$R_1$ and $R_5$ are identical, or different and are a hydroxyl-containing radical of the general formula II

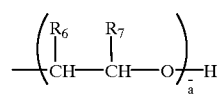

$R_2$ and $R_4$ are identical or different and are an alkyl, aryl or alkylaryl group having 1 to 12 carbon atoms
$R_3$ is a radical of the general formula III

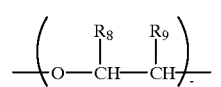

$\bar{a}$ denotes an average chain length of from 0 to 4
$\bar{i}$ denotes an average chain length of from 0 to 4
$R_6$, $R_7$, $R_8$ and $R_9$ are identical or different and are, independently of one another, H or an alkyl group having 1 to 6 carbon atoms.

2. The process as claimed in claim 1, wherein
u denotes a chain length of 0 or 1
$\bar{a}$ denotes an average chain length of from 1 to 2
$\bar{i}$ denotes an average chain length of from 1 to 2
$R_2$ and $R_4$ are identical or different and are, independently of one another, an alkyl group having 1 to 5 carbon atoms
$R_6$, $R_7$, $R_8$ and $R_9$ are identical or different and are, independently of one another, H or an alkyl group having 1 or 2 carbon atoms.

3. The process as claimed in claim 1, wherein the hydroxyalkyl phosphonates are hydroxyethyl methanephosphonate, hydroxyethyl ethanephosphonate, hydroxypropyl methanephosphonate, hydroxypropyl ethanephosphonate, hydroxyethyl propanephosphonate, hydroxypropyl propanephosphonate, diethylene glycol bis(hydroxyalkoxy) methanephosphonate and/or ethylene glycol bis(hydroxyalkoxy) ethanephosphonate.

4. The process as claimed in claim 1, wherein organic polyisocyanates are reacted with compounds having at least two isocyanate-reactive hydrogen atoms with blowing agents, stabilizers, activators and/or further auxiliaries and additives in the presence of halogen-free hydroxyalkyl phosphonates of the general formula I.

5. The process as claimed in claim 1, wherein the hydroxyalkyl phosphonates of the general formula I are compounds which are liquid at the processing temperature.

6. The process as claimed in claim 1, wherein the hydroxyalkyl phosphonates of the general formula I are isocyanate-reactive compounds.

7. The process as claimed in claim 1, wherein the hydroxyalkyl phosphonates of the general formula I exhibit high migration stability.

8. The process as claimed in claim 1, wherein the hydroxyalkyl phosphonates of the general formula I are employed in an amount of from 0.01 to 50 parts, based on the resultant flexible polyurethane foam.

9. The process as claimed in clain 1, wherein the hydroxyalkyl phosphonates of the general formula I are employed in an amount of from 0.5 to 10 parts, based on the resultant flexible polyurethane foam.

10. The process as claimed in claim 1, wherein further core discoloration inhibitors and/or flame retardants are employed.

11. A flame-resistant flexible polyurethane foam having a low susceptibility to core discoloration, which comprises, as core discoloration inhibitor and as flame retardant, halogen-free hydroxyalkyl phosphonates of the general formula I

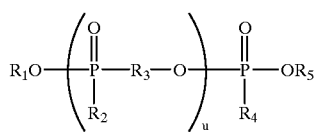

in which
u denotes a chain length of from 0 to 10
$R_1$ and $R_5$ are identical or different and are a hydroxyl-containing radical of the general formula II

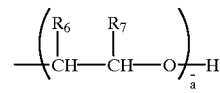

$R_2$ and $R_4$ are identical or different and are an alkyl, aryl or alkylaryl group having 1 to 12 carbon atoms
$R_3$ is a radical of the general formula III

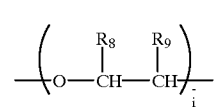

$\bar{a}$ denotes an average chain length of from 0 to 4
$\bar{i}$ denotes an average chain length of from 0 to 4
$R_6$, $R_7$, $R_8$ and $R_9$ are identical or different and are, independently of one another, H or an alkyl group having 1 to 6 carbon atoms.

* * * * *